March 13, 1956 W. P. MUNSCH 2,737,751
FISH LURE
Filed March 17, 1952
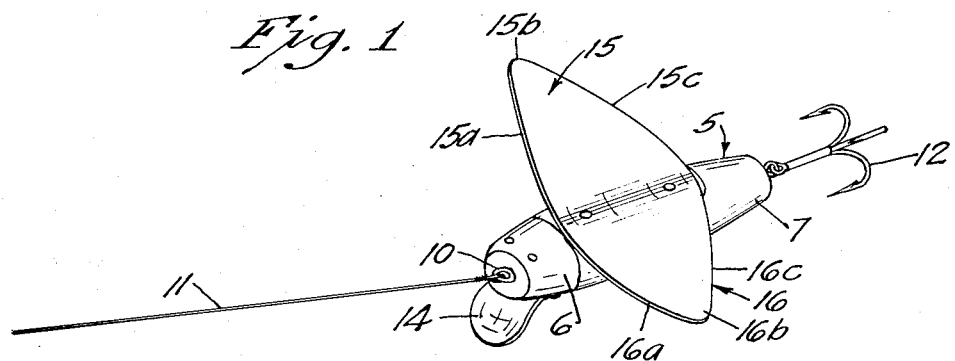
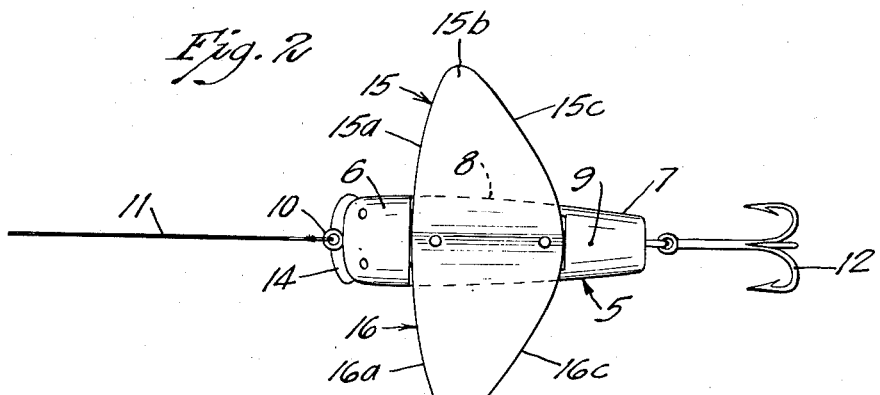
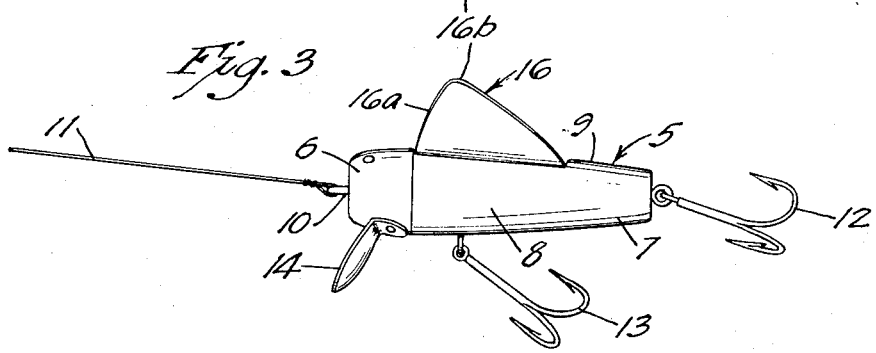
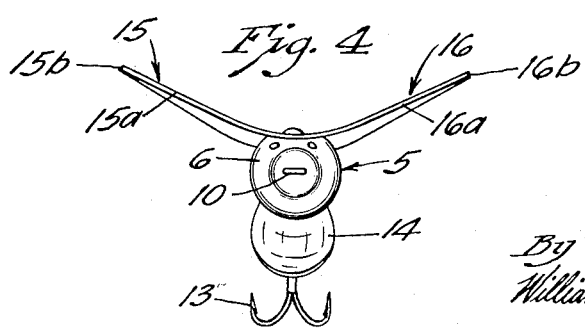
Inventor
Walter P. Munsch
By Williamson, Williamson, Schroeder, & Adams
Attorneys

United States Patent Office 2,737,751
Patented Mar. 13, 1956

2,737,751

FISH LURE

Walter P. Munsch, Wood Lake, Minn.

Application March 17, 1952, Serial No. 276,982

5 Claims. (Cl. 43—42.47)

This invention relates to fish lures. More particularly, it relates to fish lures of the immersed type which are animated to increase their effectiveness.

A more specific object is to provide a novel and improved fish lure of cheap and simple construction and increased lifelike animation.

A still more specific object is to provide a novel and improved fish lure constructed so as to have imparted thereto while being drawn through a body of water a pronounced fluttering motion about its longitudinal axis and at the same time a random oscillatory movement about a vertical axis extending through the body.

Another object is to provide a fish lure having increased animation and effectiveness and being constructed of a minimum of parts.

These and other objects and advantages of my invention will more fully appear from the following description made in connection with the accompanying drawings, wherein like reference characters refer to similar parts throughout the several views, and in which:

Fig. 1 is a perspective view of one embodiment of my invention;

Fig. 2 is a top plan view of the same;

Fig. 3 is a side elevational view of the fish lure; and

Fig. 4 is a front elevational view of the same.

One embodiment of my invention may include, as shown in Figs. 1–4, an elongated tapered body 5 which is preferably constructed of float material so that the lure will float when not being drawn through the water. I have found that the body is preferably built of wood. This body 5 has a front end portion 6, a rear end portion 7, a medial portion 8 and a top surface 9. A swivel eye 10 is connected to the forward end of the body or plug 5 and to this eye a line 11 may be attached. One hook 12 is connected to the rear end of the plug 5 and the other hook 13 is connected to the underside of the plug.

Fixedly secured to the forward end portion 6 of the plug 5 is a forwardly facing water scoop 14 which extends downwardly and forwardly from the underside of the plug. Secured to the upper surface 9 of the plug is a pair of thin rigid wings 15 and 16. These wings extend upwardly and outwardly from the top surface of the plug 5 and at their line of junction therewith extend at an angle with respect to the longitudinal axis of the body as shown. They are relatively straight throughout their length and extend upwardly at an angle of about 25 degrees from horizontal. As shown, they are constructed from a single rigid metal plate and are provided with forward or leading edges 15a and 16a which curve slightly rearwardly relative to the body 5 and are arranged so as to lie in symmetrical relation with respect to a vertical plane which passes through the longitudinal axis of the plug. These wings 15 and 16 have outer tips 15b and 16b from which their trailing edges 15c and 16c curve inwardly and rearwardly toward the medial portion of the plug 5 at an angle of about 40 degrees with respect to a line extending normal to the length of the plug. These wings 15 and 16 are rigidly secured to the top surface of the plug 5 and are not free to move relative thereto.

When my fish lure is drawn through the water two distinct and simultaneous movements are imparted to the plug 5. The wings 15 and 16 cause the plug 5 to have a fluttering type of motion about its longitudinal axis so that the wings appear to flutter backwardly and forwardly in an action simulating that of a butterfly. At the same time the body 5 oscillates about a vertical axis extending through the plug 5 intermediate its ends so that the combined actions provide a lure with a movement highly simulating that of an animal alive and in the water. The rear end portion 8 of the plug 5 appears to move backwardly and forwardly from one side to the other while at the same time the plug itself apears to oscillate backwardly and forwardly about its longitudinal axis. The scoop 14, as is usual in most plugs, serves to maintain the lure at a sufficiently low depth to prevent the same from surfacing while it is being drawn through the water.

I have found that my lure is very effective and produces an animated action which to my knowledge has not been attained previously in fishing lures. In addition to the fact that it is effective, it may be constructed from very cheap and simple materials and at a minimum of labor and material cost.

It will, of course, be understood that various changes may be made in the form, details, arrangement and proportions of the various parts without departing from the scope of my invention.

What is claimed is:

1. A fish lure comprising an elongated, rearwardly tapered, buoyant body having a rounded bottom and rounded sides, and having an upper surface, a forwardly facing concavely shaped scoop mounted on the forward end portion of said body and extending downwardly therefrom, means connected to the forward end portion of said body for drawing the same through a body of water, and a wing structure having a pair of rigid wing portions mounted on the upper surface of said body and extending laterally and upwardly therefrom and being disposed entirely between planes normal to the longitudinal axis of and passing through the end portions of said body and imparting in cooperation with said scoop dual movements to said body when it is drawn through a body of water, one of said movements being a fluttering motion about its longitudinal axis and the other being an oscillatory motion about a substantially vertical axis extending through the plug intermediate its ends and substantially normal to the longitudinal axis of said body.

2. A fish lure comprising an elongated float body having upper and lower surfaces, a scoop having a forwardly facing concavely shaped deflector surface fixedly mounted on the lower surface at the forward end portion of said body and extending downwardly therefrom, a wing structure having a pair of rigid wing portions fixedly mounted on the upper surface of said body, the wing portions defining laterally and upwardly extending parts having leading and trailing edges, said edges being respectively spaced substantially inwardly from the opposite end portions of the body and with the said leading edges being spaced rearwardly from the rear of the scoop, means connected to said body for drawing the same through a body of water with said deflector surface facing generally forwardly, whereby the said wing structure and scoop in cooperation with each other provide dual movements to said body when it is drawn through a body of water, one of said movements being a fluttering motion about the longitudinal axis of the body and the other of said movements being an oscillatory motion about an axis extending vertically through and substantially normal to the longitudinal axis of said body.

3. A fish lure as defined in and by claim 2, wherein the laterally and upwardly extending parts of the pair of rigid wing portions taper to an apex, the said leading edges being on a lesser curve than the said trailing edges.

4. A fish lure comprising an elongated rearwardly tapered float body having an upper surface, a forwardly facing concavely shaped scoop mounted on the forward end portion of said body and extending downwardly therefrom, means connected to said body for drawing the same through a body of water with the scoop facing forwardly, and a wing structure defining a pair of rigid wing portions mounted on the upper surface of said body, said wing portions being joined along a line of junction extending lengthwise of said body at an angle with respect to the longitudinal axis of said body, said wing portions extending laterally and upwardly from said body and being disposed entirely between planes normal to said longitudinal axis and passing through the end portions of said body, said wing structure imparting in cooperation with said scoop dual movements to said body when it is drawn through a body of water, one of said movements being a fluttering motion about said longitudinal axis and the other being an oscillatory motion about an axis extending vertically through the body substantially normal to the longitudinal axis of said body.

5. A fish lure according to claim 4, wherein said wing portions have leading edges which curve upwardly and rearwardly relative to said body, said leading edges terminating in curved outer tips from which trailing edges curve diagonally and rearwardly toward said line of junction.

References Cited in the file of this patent

UNITED STATES PATENTS

| | | |
|---|---|---|
| 779,083 | Jamison | Jan. 3, 1905 |
| 1,010,783 | Mooney | Dec. 5, 1911 |
| 1,738,617 | Scharrer | Dec. 10, 1929 |
| 1,873,682 | Van Ness | Aug. 23, 1932 |
| 2,051,978 | Accetta | Aug. 25, 1936 |
| 2,204,552 | Singleton | June 18, 1940 |
| 2,350,572 | Schweigert | June 6, 1944 |
| 2,502,879 | Nikander | Apr. 4, 1950 |
| 2,515,018 | Parnell | July 11, 1950 |